United States Patent [19]

Okamoto

[11] Patent Number: 5,050,073
[45] Date of Patent: Sep. 17, 1991

[54] MICROINSTRUCTION EXECUTION SYSTEM FOR REDUCING EXECUTION TIME FOR CALCULATING MICROINSTRUCTION

[75] Inventor: Kosei Okamoto, Kunitachi, Japan

[73] Assignee: Kabushiki Kaisha Toshiba, Kawasaki, Japan

[21] Appl. No.: 139,814

[22] Filed: Dec. 30, 1987

[30] Foreign Application Priority Data

Jan. 9, 1987 [JP] Japan .................. 62-1871

[51] Int. Cl.$^5$ .............................. G06F 9/22
[52] U.S. Cl. .................. 364/200; 364/231.8; 364/247; 364/247.1; 364/247.4; 364/262.8; 364/263
[58] Field of Search ............... 364/200, 900, 715, 711, 364/712, 749, 757

[56] References Cited

U.S. PATENT DOCUMENTS

| | | | |
|---|---|---|---|
| 3,651,476 | 3/1972 | Metz et al. | 364/200 |
| 4,041,462 | 8/1977 | Davis et al. | 364/200 |
| 4,047,161 | 9/1977 | Davis | 364/200 |
| 4,103,329 | 7/1978 | Davis et al. | 364/200 |
| 4,131,943 | 12/1978 | Shiraogawa | 364/200 |
| 4,156,927 | 5/1979 | McElroy et al. | 364/900 |
| 4,228,498 | 10/1980 | Moshier | 364/200 |
| 4,240,137 | 12/1980 | Matsumoto et al. | 364/200 |
| 4,306,285 | 12/1981 | Moriya et al. | 364/200 |
| 4,314,333 | 2/1982 | Shibayama et al. | 364/200 |
| 4,382,279 | 5/1983 | Ugon | 364/200 |
| 4,396,979 | 8/1983 | Mor et al. | 364/200 |
| 4,446,533 | 5/1984 | Backhouse | 364/900 |
| 4,449,184 | 5/1984 | Pohlman et al. | 364/200 |
| 4,541,047 | 9/1985 | Wada et al. | 364/200 |
| 4,564,920 | 1/1986 | Briggs | 364/757 |
| 4,594,655 | 6/1986 | Hao et al. | 364/200 |
| 4,615,004 | 9/1986 | Chevillat et al. | 364/200 |
| 4,616,313 | 10/1986 | Aoyagi | 364/200 |
| 4,630,195 | 12/1986 | Hester et al. | 364/200 |
| 4,631,672 | 12/1986 | Sakamoto | 364/200 |
| 4,656,578 | 4/1987 | Chilinski et al. | 364/200 |
| 4,739,470 | 4/1988 | Wada et al. | 364/200 |

OTHER PUBLICATIONS

ISSCC 81; Session XVI; Fam 16.2: A 16b; "CMOS/NMOS SOS Microprocessor", Jun Iwamura et al.; 2/20/1981.
Toshiba Review; No. 132; pp. 33–36; "16-Bit SOS Microprocessor T88000"; Masamichi Sugai et al.; 1981.

*Primary Examiner*—Gareth D. Shaw
*Assistant Examiner*—Matthew C. Fagan
*Attorney, Agent, or Firm*—Foley & Lardner

[57] ABSTRACT

A microinstruction executing system includes a sequencer for controlling sequential readout of microinstructions from a ROM for storage in a microinstruction register and for subsequent decoding by a decoder. In response to a destination control signal (source side) from the decoder, a general register will transfer data to a destination bus and in response to a destination control signal (destination side) from the decoder, data from the destination bus will be transferred to one of a destination data register or a source data register. In response to a source control signal (source side) from the decoder, the general register will transfer data to a source bus and in response to a source control signal (destination side) from the decoder data from the source bus will be transferred to one of the destination data register or source data register. Further, in response to an operation control signal from the decoder an arithmetic logic unit will perform an appropriate calculation upon data available to it from either the destination data register or source data register with the result of the calculation being transferred to the destination data register by way of the destination data bus. These operations up to a transferal of the calculated result to the destination data register will occur in the first half period of a microinstruction time while during the second half period of the microinstruction time a like transfer of data a succeeding calculation will be effected in accordance with the same control signals.

4 Claims, 4 Drawing Sheets

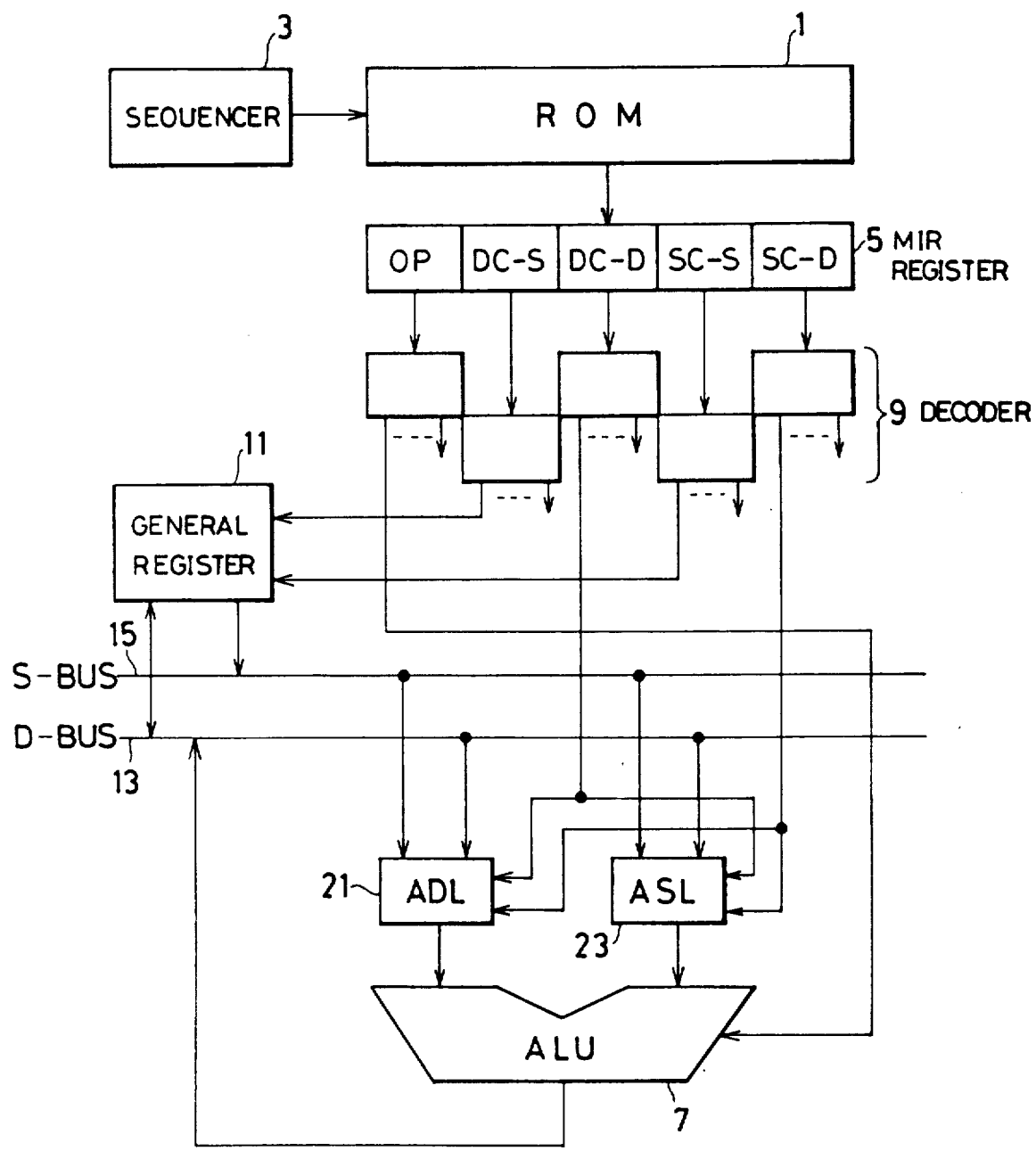

FIG. 3

| O P | DC-S | DC-D | SC-S | SC-D |

| | (INVENTION) | (PRIOR ART) |
|---|---|---|
| a1 ---- (NOP) | GR0,ADL,GR1,ASL<br>(21)    (23) | MOV GR5,GR0 |
| a2 ---- ADD | ALU,ADL,GR2,ASL<br>(21)    (23) | ADD GR5,GR1 |
| a3 ---- ADD | ALU,ADL,GR3,ASL<br>(21)    (23) | ADD GR5,GR2 |
| a4 ---- ADD | ALU,ADL,GR4,ASL<br>(21)    (23) | ADD GR5,GR3 |
| a5 ---- ADD | ALU,GR5,(NOP)(NOP)<br>|←— 1/2 —→|←— 1/2 —→| | ADD GR5,GR4 |

MICROINSTRUCTION EXECUTION SYSTEM FOR REDUCING EXECUTION TIME FOR CALCULATING MICROINSTRUCTION

BACKGROUND OF THE INVENTION

1. Field of the Invention

The present invention relates to a microinstruction executing system and more specifically to a high speed microinstruction executing system which can reduce the execution processing time of a microprocessor.

2. Description of the Prior Art

FIG. 1(A) shows an example of a prior-art microinstruction executing system incorporated in a microprocessor. The system comprises a ROM 1, a sequencer 3, a microinstruction register 5, a decoder 9, a general register 11, an arithmetic unit 7, a D (destination) bus 13, a S (source) bus 15, a latch 17, and a timing generator 19.

The ROM 1 stores microprograms composed of microinstructions for executing machine language instructions given externally. These microinstructions stored in this ROM 1 are read in sequence under control of a sequencer 3 and then held temporarily in a microinstruction (MIR) register 5. The MIR register 5 includes an operation (op) field for controlling operations of an arithmetic unit (ALU) 7, a destination control (DC) field for designating a register which holds destination data operated on by the ALU 7, and a source control (SC) field for designating a register which holds source data for the succeeding calculation operation.

The microinstructions held in the MIR register 5 are decoded by the decoder 9, and control signals from each field of the MIR register 5 are generated to control the corresponding parts of the system. That is, the control signals from the OP field are supplied to the ALU 7, and control signals from the DC field and the SC field are supplied to the general register 11.

The general register 11 is composed of plural registers which store various data such as source data, destination data, etc. These data are written in the general register 11 via the D (destination) bus 13, and read from the general register 11 via the D bus 13 and the S (source) bus 15.

The ALU 7 executes various arithmetic operations between data supplied from the general register 11 via the S bus 15 and data latched in a latch register 17 from the general register 11 via the D bus 13. The results of these operations are transferred to the general register 11 again via the D bus 13 and stored therein.

A timing generator 19 generates timing signals for controlling the data transfer timing among the general register 11, the latch register 17, and the ALU 7. These timing signals are generated by dividing a single machine clock in accordance with data transfer timings.

In the above-mentioned configuration, execution processing of microinstructions such as "ADD, GR0, GR1" (add a value (GR0) of a register GR0 and a value (GR1) of a register GR1, and store the result of addition (ALU) in the register GR0) will be described with reference to FIG. 1(B).

When the above-mentioned microinstruction is read from the ROM 1, the microinstruction is decoded by the decoder 9, so that data of the register GR0 is read out to the D bus 13 and data of the register GR1 is read out to the S bus 15. As by the timing chart shown in FIG. 1(B), these operations are executed during a duration $\phi_1$ obtained by dividing a single machine clock.

The data on the D bus 13 and the S bus 15 are supplied to the ALU 7 during a duration $\phi_2$ shown in FIG. 1(B) for addition. That is, the data transfer processing from the register GR0 and the register GR1 and the data addition processing are executed during a duration $To = (\phi_1 + \phi_2)$ shown in FIG. 1(B).

The result of the ALU 7 operation is put on the D bus 13; data on the D bus 13 is latched by the latch register 17; and the result of addition on the D bus 13 is stored in the register GR0 during a duration $\phi_3$ shown in FIG. 1(B).

In the prior-art microinstruction executing system, although the execution processing of the microinstruction is implemented as described above, the execution time (one machine clock) for one microinstruction in the system shown in FIG. 1(A) is divided into the read (transfer) time $\phi_1$ for the two data to be transferred from the registers to the ALU, the addition operation time $\phi_2$ the ALU 7, and the storing (transfer) time $\phi_3$ of the result of addition in the register, thus taking a long instruction execution time.

Further, since a series of operations of data read, addition operation, addition result transfer and store are executed in response to timing signals produced by dividing a machine clock, there exist various problems in that the control operations are complicated and a timing generator 19 for generating timing signals is required, thus complicating the system configuration.

SUMMARY OF THE INVENTION

With these problems in mind, therefore, it is the primary object of the present invention to provide a microinstruction executing system which can facilitate control of execution processing and thus execute instructions at high speed by reducing one machine clock duration or an execution processing unit time for one microinstruction.

To achieve the above-mentioned object, a microinstruction executing system for executing machine instructions in accordance with microinstructions, according to the present invention, comprises: (a) a general storing unit for storing information data for calculation; (b) a calculating unit for executing calculations on the basis of the information data stored in said general storing unit; (c) a destination data register unit for temporarily storing destination information data to be transferred from said general storing unit to said calculating unit; (d) a source data register unit for temporarily storing source information data to be transferred from said general storing unit to said calculating unit; and (e) a unit for simultaneously executing a calculation operation for two information data temporarily stored in said destination data register unit and said source data register unit, a transfer operation for a calculated result to said destination data register unit, and a transfer operation for information data necessary for the succeeding calculation operation from said general storing unit to said source data register unit, within one machine cycle.

The simultaneous calculation and transfer executing unit comprises (a) a microinstruction register unit for storing each microinstruction, said microinstruction register unit being provided with microinstruction fields for generating control signals for said general storing unit, said destination data register unit and said source data register unit and with another microinstruction field for generating a control signal for said calculating unit; and (b) a decoder unit for decoding each microinstruction stored in each field of said microinstruction register unit into each control signal.

In the system according to the present invention, within the first half period of one microinstruction execution time (one machine cycle), the arithmetic unit executes an addition operation; and further within the second half period the resultant addition value is transferred to the destination data register and succeeding data necessary for the succeeding addition operation is transferred to the source data register. Therefore, one machine cycle can be reduced, and further the system can be controlled easily because no timing signals are required within one machine cycle.

BRIEF DESCRIPTION OF THE DRAWINGS

The features and advantages of the microinstruction executing system according to the present invention will be more clearly appreciated from the following description of the preferred embodiment of the invention taken in conjunction with the accompanying drawings in which like reference numerals designate the same or similar elements or sections throughout the figures thereof and in which:

FIG. 2 is a block diagram showing an embodiment of the microinstruction executing system of the present invention;

FIG. 3 is an illustration showing a microinstruction format used for the microinstruction executing system shown in FIG. 2;

FIG. 4 is examples of microprograms used for the microinstruction executing system of the present invention in comparison with those used for the prior-art microinstruction executing system;

DETAILED DESCRIPTION OF THE PREFERRED EMBODIMENT

Figure 1A:
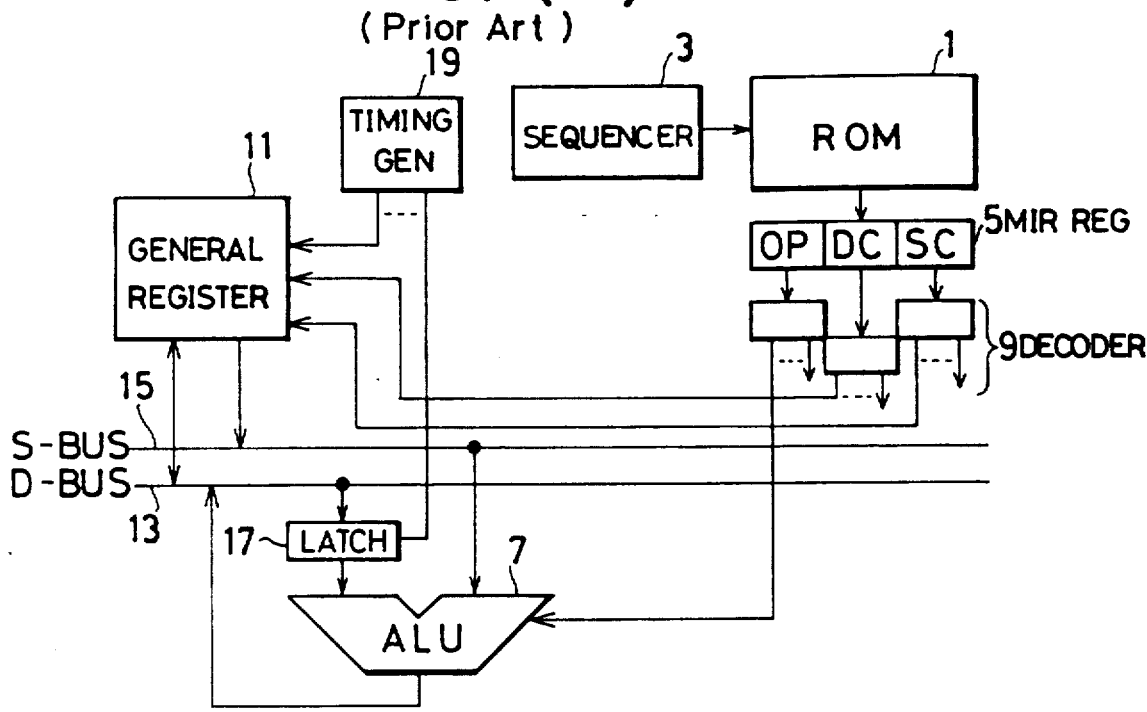
FIG. 1(A) is a block diagram showing a prior-art microinstruction executing system incorporated in a microprocessor.

With reference to the attached drawings, an embodiment of the microinstruction executing system of the present invention will be described hereinbelow.

In FIG. 2, the system comprises a ROM 1, a sequencer 3, a MIR (microinstruction) register 5, a decoder 9, a general register 11, a D (destination) bus 13, a S (source) bus 15, an ADL (destination data) register 21, an ASL (source data) register 23, and an ALU (arithmetic unit) 7.

In the system, microinstructions read from the ROM 1 in sequence under control of the sequencer 3 are once stored in the MIR register 5 and then decoded by the decoder 9. In accordance with the control signals from the decoder 9, data are transferred from the general register 11 to the ADL register 21 and the ASL register 23 via the D bus 13 and the S bus 15. These data are stored temporarily in the ADL 21 and ASL 23 registers and are used for calculation (e.g. added) by the ALU 7.

FIG. 3 shows a format of a microinstruction to be read in sequence from the ROM 1 by the sequencer 3.

The format includes an op (operation) field for controlling arithmetic operations of the ALU 7, a DC-S (destination control on source side) field for designating a register to transfer data from the general register 11 and the ALU 7 to the D bus 13, a DC-D (destination control on destination side) field for designating a register to transfer data from the D bus 13 to the registers 21, 23 and the general register 11, a SC-S (source control on source side) field for designating a register to transfer data from the general register 11 to the S-source bus 15, and a SC-D (source control on destination side) field for designating a register for transfer of data from the S bus 15 to the registers 21 and 23.

In FIG. 2, data on the D bus 13 or the S bus 15 is stored into the ADL register 21 temporarily. In more detail, the ADL register 21 holds data on the D bus 13 in response to a control signal supplied by the decoder 9 after decoding the DC-D field of a microinstruction register 5, and also data on the S bus 15 in response to a control signal supplied by the decoder 9 decoding the SC-D field of a microinstruction register 5. These data once held in the ADL register 21 are provided to the ALU 7 in response a control signal supplied from the op field of a microinstruction for calculation.

In the same way, the ASL register 23 holds data on the D-BUS 13 in response to a control signal supplied from the DC-D field of a microinstruction register 5, and also data on the S-BUS 15 in response to a control signal supplied from the SC-D field of a microinstruction register 5. These data once held in the ASL register 23 are provided to the ALU 7 in response to a control signal supplied from the op field of a microinstruction for calculation.

The operation of the system will be explained with reference to a microprogram shown in FIG. 4. This microprogram shown in FIG. 4 represents "Calculate the sum total" of data stored in registers from a register GR0 to a register GR4 of the general register 11 and store the calculated result in a register GR5. This microprogram is composed of five microinstructions (a1 to a5) as shown in FIG. 4, and one machine cycle is required for each execution processing of one microinstruction.

Figure 5:
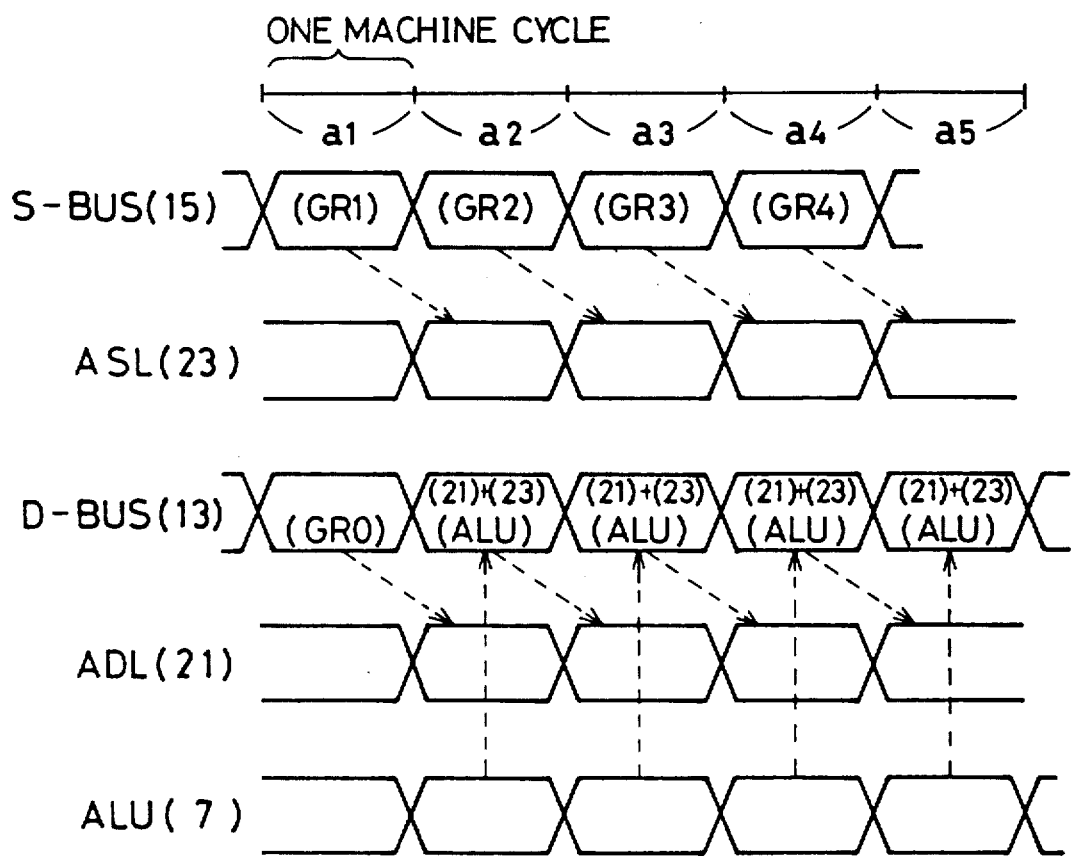
FIG. 5 is a timing chart for assistance in explaining the execution of the microprograms shown in FIG. 4.

A microinstruction a1 is read from the ROM 1 into the microinstruction register 5 and the decoder 9 generates control signals by decoding the fields of the microinstruction register 5. In response to these control signals, data (GR0) in the register GR0 of the general register 11 is transferred to the D bus 13 and then to the ADL register 21. Simultaneously, data (GR1) in the register GR1 is transferred to the S bus 15 and then to the ASL register 23. The above two transfers are executed within one machine cycle (a1) as shown in FIG. 5.

In the succeeding execution processing of a microinstruction a2, data (GR0) in the ADL register 21 and data (GR1) in the ASL register 23 are added by the ALU 7. The result of addition (GR0+GR1) is transferred to the ADL register 21 via the D-bus 13. Simultaneously, a data (GR2) in the register GR2 is transferred to the ASL register 23 via the S bus 15.

Similarly, in the succeeding execution processing of a microinstruction a3, data (GR0+GR1) held in the ADL register 21 and data (GR2) held in the ASL register 23 are added by the ALU 7. The result of addition (GR0+GR1+GR2) is transferred the ADL register 21 via the D bus 3. Simultaneously, data (GR3) in the register GR3 is transferred to the ASL register 23 via the S bus 15.

Similarly, in the succeeding execution processing of a microinstruction a4, data (GR0+GR1+GR2) held in the ADL register 21 and data (GR3) held in the ASL register 23 are added by the ALU 7. The result of addition (GR0+GR1+GR2+GR3) is transferred to the ADL register 21 via the D bus 13. Simultaneously, data (GR4) in the register GR4 is transferred to the ASL register 23 via the S bus 15.

In the last execution processing of a microinstruction a5, data (GR0+GR1+GR2+GR3) held in the ADL register 21 and data (GR4) held in the ASL register 23 are added by the ALU 7. The result of addition (GR0+GR1+GR2+GR3+GR4) 13 is transferred to and to the register GR5 via the D bus 13, thus completing the execution of the microprograms.

Figure 1B:
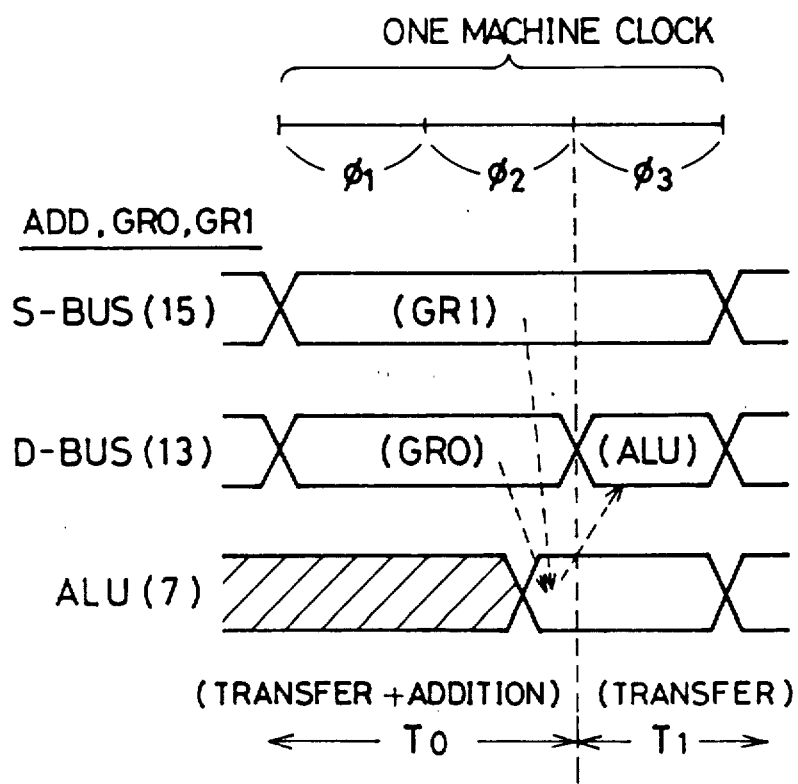
FIG. 1(B) is a timing chart of the prior-art microinstruction executing system shown in FIG. 1(A)

FIG. 4 shows the same five microinstructions executed by the prior-art system shown in FIG. 1 for comparison.

In a first microinstruction "MOVE GR5, GR0" data (GR0) held in a register GR0 of the general register 11 is moved to a register GR5 in the same general register 11. In a second microinstruction "ADD GR5, GR1", data (GR0) in the register GR5 and data (GR1) held in a register GR1 of the general register 11 are added and the result of addition is moved into GR5. In a third microinstruction "ADD GR5, GR2", data (GR0+GR1) in the register (GR5) and data (GR2) held in a register GR2 of the general register 11 are added, and so on.

Figure 6:
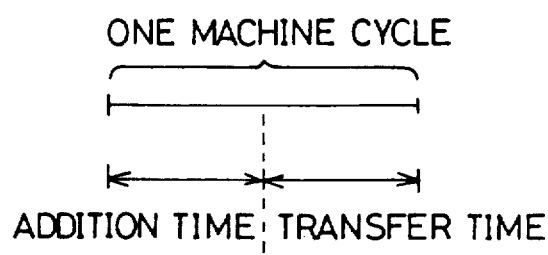
FIG. 6 is an illustration for assistance in explaining one machine cycle of the executing system of the present invention.

As described above, in the system of the present invention, since addition is implemented by the ALU 7 in the first half of one machine cycle (during which one microinstruction is executed), the result of addition and succeeding data to be added are transferred to the ADL register 21 and the ASL register 23 in the second half of one machine cycle, as depicted in FIG. 6, it is possible to simultaneously execute (1) transfer of data to be added from the general register 11 to the ASL register 23 and (2) an addition operation by the ALU 7 and (3) a transfer of the added result to the ADL register 21 within a single machine cycle. Further, the system of the present invention requires no timing signal generator and the registers and the ALU 7 can be controlled more easily.

Further, since data are transferred between the D bus 13 and the general register 11 in the same direction within one machine cycle, it is unnecessary to switch the transfer direction of the general register 11, thus facilitating the control operation of the system.

As described above, according to the present invention, since the calculation operation, the transfer operation of the resultant calculated data, and the transfer operation of data necessary for the succeeding calculation can be executed simultaneously, it is possible to reduce the one machine cycle interval and therefore to increase the execution speed of microinstructions. Further, since the above-mentioned operations can be implemented in accordance with only control signals held in control fields of the microinstruction register without particular timing control signals, the execution of the microinstructions can be controlled more easily.

What is claimed is:

1. A microinstruction executing system for reducing execution time of calculation microinstructions, comprising:

(a) general storing means for storing data, including source data and destination data;
(b) calculating means for performing calculation operations upon data;
(c) destination data register means, coupled to said general storing means and to said calculating means, for temporarily storing destination data sent from said general storing means to be transferred to said calculating means;
(d) source data register means, coupled to said general storing means and to said calculating means, for temporarily storing source data sent from said general storing means to be transferred to said calculating means;
(e) means, coupled to said general storing means, to said calculating means, to said destination data register means, and to said source data register means, for executing calculation microinstructions, each of said microinstructions being
  (1) for performing a calculation operation by said calculating means upon said source data and said destination data temporarily stored in said source data register means and said destination data register means, respectively,
  (2) for transferring a calculated result of said calculation operation to said destination data register means, and
  (3) for transferring source data necessary for a succeeding calculation operation from said general storing means to said source data register means;
whereby each microinstruction performs (1), (2), and (3) all within a predetermined cycle.

2. A microinstruction executing system as set forth in claim 1, wherein said means for executing calculation microinstructions comprises
  (1) microinstruction register means for storing each of said microinstructions in a predetermined format, said microinstruction register means comprising microinstruction fields, and
  (2) decoder means, coupled to said microinstruction register means, to said general storing means, to said calculating means, to said destination data register means, and to said source data register means, for decoding each microinstruction stored in said microinstruction register means and for generating control signals from said microinstruction fields to said general storing means, to said calculating means, to said destination data register means, and to said source data register means.

3. A microinstruction executing system as set forth in claim 2, wherein said decoder means generates
  (i) a first control signal, from an operation field of said microinstruction fields to said calculating means, for controlling calculation operations by said calculating means,
  (ii) a second control signal, from a first destination field of said microinstruction fields to said general storing means, for transferring data from said general storing means to a destination bus coupled to said general storing means, to said source data register means, and to said destination data register means,
  (iii) a third control signal, from a second destination field of said microinstruction fields to a selected one of said destination data register means and said source data register means, for transferring data from said destination bus to said selected one of said register means, (iv) a fourth control signal, from a first source field of said microinstruction fields to said general storing means, for transferring data from said general storing means to a source bus coupled to said general storing means, to said source data register means, and to said destination data register means, and (v) a fifth control signal from a second source field of said microinstruction fields to a selected one of said destination data register means and said source data register means, for transferring data from said source bus to said selected one of said register means.

4. A method of reducing execution time of calculation microinstructions, which comprises the following steps:

(a) storing a series of said microinstructions in a ROM;

(b) storing data for calculation operations in general registers;

(c) sequentially reading said microinstructions one by one from said ROM;

(d) storing one microinstruction of said sequentially read microinstructions from said ROM in a predetermined format in a microregister, said microregister including microinstruction fields;

(e) decoding said one microinstruction for generating control signals from said microinstruction fields, said control signals including (1) a first control signal to control a calculation operation of an arithmetic unit, (2) a second control signal to transfer data from said general registers to a destination bus, (3) a third control signal to transfer data from said destination bus to one of a destination data register and a source data register, (4) a fourth control signal to transfer data from said general registers to a source bus, and (5) a fifth control signal to transfer data from said source bus to one of said destination data register and said source data register; and (f) executing said one microinstruction in response to said decoding of said one microinstruction, whereby during a first half period of a predetermined microinstruction time, said one microinstruction (1) performs a calculation operation by said arithmetic unit upon destination and source data stored in said destination data register and said source data register, respectively, and whereby during a second half period of said predetermined microinstruction time, said one microinstruction (2) transfers a calculated result of said calculation operation to said destination data register, and (3) transfers source data necessary for a succeeding calculation operation from said general registers to said source data register.

* * * * *